United States Patent
Khatri et al.

(10) Patent No.: US 9,710,418 B2
(45) Date of Patent: Jul. 18, 2017

(54) SYSTEM AND METHOD FOR SECURITY CONFIGURATION

(75) Inventors: Mukund P. Khatri, Austin, TX (US); Kevin T. Marks, Round Rock, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 1291 days.

(21) Appl. No.: 12/355,398

(22) Filed: Jan. 16, 2009

(65) Prior Publication Data
US 2010/0185799 A1    Jul. 22, 2010

(51) Int. Cl.
G06F 7/04         (2006.01)
G06F 13/42        (2006.01)
G06F 21/85        (2013.01)

(52) U.S. Cl.
CPC .......... *G06F 13/4282* (2013.01); *G06F 21/85* (2013.01); *G06F 2213/0026* (2013.01)

(58) Field of Classification Search
CPC ................ G06F 13/4282; G06F 21/85; G06F 2213/0026
USPC ...................................... 726/16–19
See application file for complete search history.

(56) References Cited

U.S. PATENT DOCUMENTS

| | | | |
|---|---|---|---|
| 2004/0255023 A1* | 12/2004 | Motoyama et al. | 709/224 |
| 2005/0091338 A1* | 4/2005 | de la Huerga | 709/217 |
| 2005/0101293 A1* | 5/2005 | Mentze et al. | 455/410 |
| 2005/0163317 A1 | 7/2005 | Angelo et al. | |
| 2005/0166024 A1 | 7/2005 | Angelo et al. | |
| 2005/0262269 A1* | 11/2005 | Pike | 710/1 |
| 2005/0283826 A1 | 12/2005 | Tahan | |
| 2006/0101456 A1 | 5/2006 | Crosier et al. | |
| 2006/0101459 A1 | 5/2006 | Crosier et al. | |
| 2006/0105714 A1* | 5/2006 | Hall et al. | 455/41.3 |
| 2006/0184789 A1* | 8/2006 | Karasawa et al. | 713/160 |
| 2006/0253619 A1* | 11/2006 | Torudbakken | G06F 13/4022 710/31 |
| 2006/0262781 A1* | 11/2006 | Campini et al. | 370/389 |
| 2007/0118743 A1 | 5/2007 | Thornton et al. | |
| 2007/0198996 A1 | 8/2007 | Chiu et al. | |
| 2007/0250710 A1* | 10/2007 | Thibadeau | H04L 9/0838 713/168 |
| 2008/0046758 A1* | 2/2008 | Cha et al. | 713/189 |
| 2009/0083536 A1* | 3/2009 | Weis | H04L 12/1886 713/153 |

* cited by examiner

*Primary Examiner* — Farid Homayounmehr
*Assistant Examiner* — Suman Debnath
(74) *Attorney, Agent, or Firm* — Baker Botts L.L.P.

(57) ABSTRACT

A system and method for accessing and identifying the security parameters of a device in an information handling system is disclosed. A device in a computer system may operate according to a defined security protocol, and multiple security protocols may exist across the devices of the system. In operation, a configuration capability is defined within the PCI Express communications protocol. This capability includes a capabilities data structure through which parameters concerning the security parameters of the device may be identified and passed to a processor.

14 Claims, 3 Drawing Sheets

SYSTEM AND METHOD FOR SECURITY CONFIGURATION

TECHNICAL FIELD

The present disclosure relates generally to computer systems and information handling systems, and, more particularly, to a system and method for identifying the security configuration of security-enabled elements of a computer system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include a number of hardware components that are security-enabled. These security-enabled components may operate according to the Trusted Platform Module or some other security protocol that limits access to or modification of the hardware component to a user having password access. In addition, encryption is becoming more common in hardware devices, limiting the ability to read data from the device without the availability of the required cryptographic key. In a computer system, multiple devices may require the use of a cryptographic key, and those devices may operate according to multiple security platforms, without the ability of each device to report its security characteristics and without the ability to centrally provision and initialize the security aspects of the devices across the various security platforms.

SUMMARY

In accordance with the present disclosure, a system and method for accessing and identifying the security parameters of a device in an information handling system is disclosed. A device in a computer system may operate according to a defined security protocol, and multiple security protocols may exist across the devices of the system. In operation, a configuration capability is defined within the PCI Express communications protocol. This capability includes a capabilities data structure through which parameters concerning the security parameters of the device may be identified and passed to a processor.

The system and method disclosed herein is technically advantageous because it uses an existing communications protocol to provide information concerning the various security protocols that exist on the devices of the network. The system and method described herein operates within the standards of and without a modification to the existing communications protocol. The system and method disclosed herein is also technically advantageous because it provides a technique for the computer system to manage the devices of the computer system and the security features of those devices across multiple, different security protocols, thereby providing the processor of the computer system with greater control over the security features of the computer system across different security domains. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
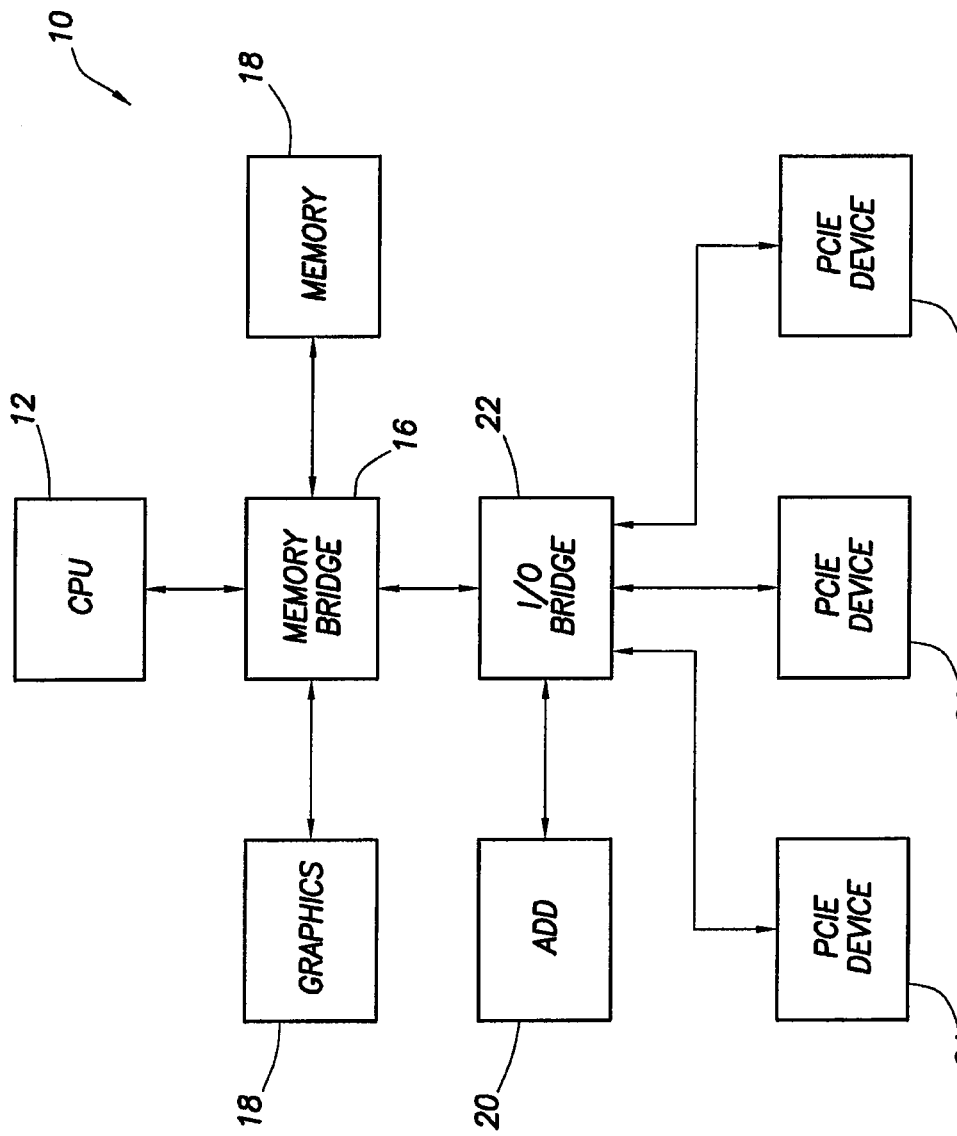
FIG. 1 is a diagram of the architecture of an information handling system.

Shown in FIG. 1 is a diagram of the architecture of an information handling system, which is indicated generally at 10. The computer system 10 includes a CPU or processor 12 that is coupled to a memory bridge 16. Memory bridge 16 is coupled to a graphics processor 14, system memory 18, and an I/O bridge 22. I/O bridge 22 is coupled to one or more hard disk drives or other storage 20 and a plurality of PCI Express (PCIe) devices 24. PCIe devices 24 may operate according to a security protocol, such as the Trusted Platform Module (TPM), and may require authentication through a cryptographic password before the PCIe device may be used or accessed.

Figure 2:
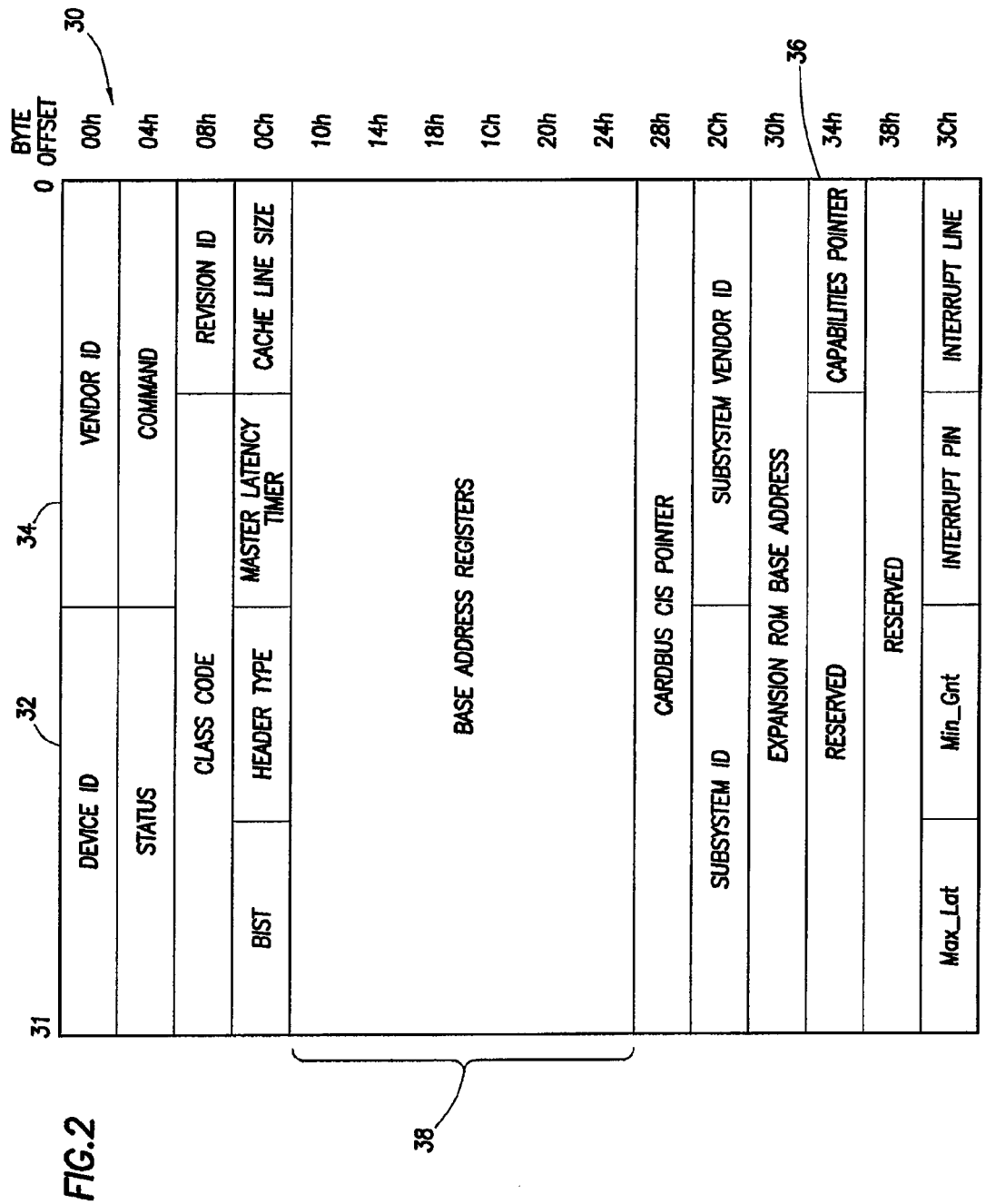
FIG. 2 is a diagram of a configuration space header.

The PCI Express standard includes a configuration space, which allows for the development and establishment of PCI Express capabilities. Shown in FIG. 2 is a configuration space header 30. For each device, the Vendor ID 34 will identify the supplier of the device and the Device ID 32 will uniquely identify the device within the computer system. Configuration space header 30 includes a Capabilities Pointer 36, which is the configuration register address of the first capability associated with the PCIe device, Configuration space header 30 also includes a set of base address registers 38.

Figure 3:
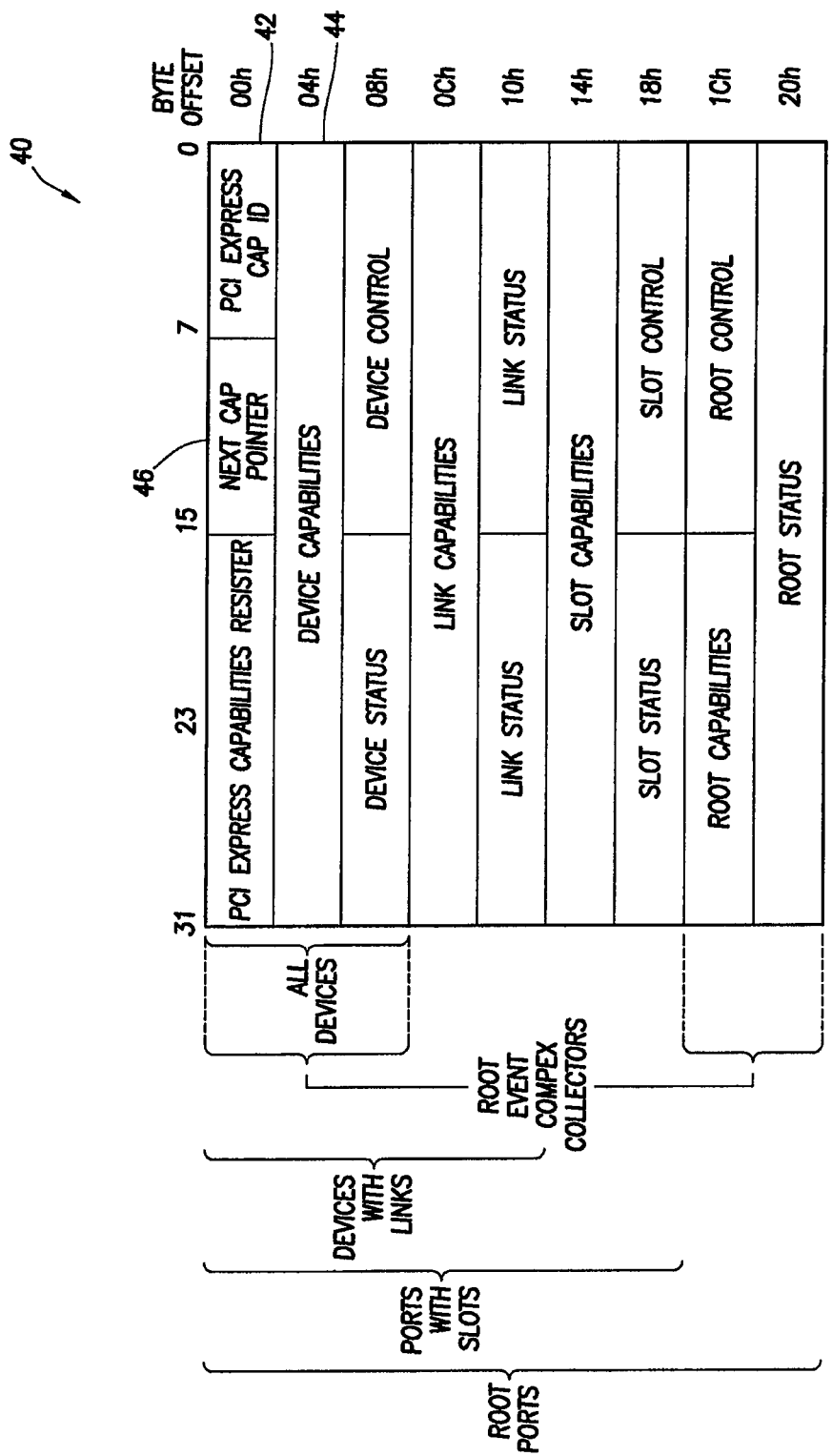
FIG. 3 is a diagram of a PCIe capability data structure.

Each capability is defined by a data structure. An example of a PCIe capability structure 40 is shown in FIG. 3. At byte offset 00h, PCI Express Capability ID 42 is a unique ID associated with the capability. For the security reporting capability of the present disclosure, there will be a predefined capability identifier associated with the security reporting capability and this capability identifier will be shared with and used by other PCI devices. The PCIe capability structure 40 also includes a device capabilities entry 44 at offset 04h, which identifies the security capabilities of the device. The identification of security capabilities may include an identification of the security protocol being used by the device, a flag that identifies whether the device is password-enabled, an identification of the format of the password, the address of the password (if the password is saved locally to the computer system), an identification of whether the password is cryptographically wrapped, or the address or other identifier of the administrator of the security protocol for the device. The capability structures 40 of the computer system form a linked list, with each capability structure including a Next Capability Pointer entry 46 that points to the next capability structure in the computer system.

The base address registers 38 of configuration space header 30 can also be used to enable the host computer system to access the security layer of the security-enabled devices of the computer system. Configuration space header 30 can include as many as six base address registers 38. One more of these base register addresses is dedicated to the address associated with the security features of the device, thereby providing the processor of the system with the memory address of data associated with the security features of the device. Alternatively, the base address register for the security features of the device could be stored to the device capabilities entry 42 of the capability structure 40. The ability of the processor to identify the address of the security features of the device enables the processor to perform the steps necessary to enable or disable the I/O security layer of the device. In addition, because the processor is able to access the address of the security features of the device, the processor can associate or disassociate the security features of the device with the security features of the computer system, which may operate according to different security protocols.

Although this invention has been described herein in terms of the PCI Express communications protocol, it should be understood that the system and method described herein may be employed with other communications protocol in which security parameters may be accessed through a data structure of the communications protocol. Although the present disclosure has been described in detail, it should be understood that various changes, substitutions, and alterations can be made hereto without departing from the spirit and the scope of the invention as defined by the appended claims.

What is claimed is:

1. An information handling system, comprising:
a processor;
one or more devices coupled directly or indirectly to the processor, wherein the one or more devices are able to communicate with the processor according to a communications protocol, wherein the one or more devices are security-enabled;
wherein the communications protocol includes, for each of the one or more devices, an identification of at least one security parameter;
wherein the at least one security parameter comprises at least a security protocol of the one or more devices, wherein the at least one security parameter further comprises an identification of whether a password related to the device is cryptographically wrapped;
wherein the at least one security parameter is within one or more base address registers of at least one of a capability structure of a plurality of capability structures of the PCI Express communications protocol;
wherein the one or more base address registers enable access to a security layer of at least one of the one or more devices so that at least one of the one or more processors can enable or disable an input/output security layer of the at least one of the one or more devices;
wherein each of the plurality of capability structures comprises a unique identifier and a capability identifier,
wherein the capability identifier associated with the at least one of the one or more devices is shared with and used by one or more other devices;
wherein the plurality of capability structures form a linked list;
wherein each of the plurality of capability structures includes a next capability pointer entry that points to at least one other of the plurality of capability structures; and
wherein the security protocol of the device is a Trusted Platform Module supported by the at least one capability structure.

2. The information handling system of claim 1, wherein the communications protocol is PCI Express.

3. The information handling system of claim 2, wherein the at least one security parameter of each of the one or more devices is stored in a header associated with a configuration space of the PCI Express 15 communications protocol.

4. The information handling system of claim 1, wherein the at least one security parameter is an identification of whether the one or more devices are password-enabled.

5. The information handling system of claim 1, wherein the at least one security parameter is an address of the security password for the one or more devices.

6. The information handling system of claim 1, wherein the at least one security parameter is a format of the security password for the one or more devices.

7. A method for providing a security parameter for one or more devices, comprising:
storing in a data structure associated with each of the one or more devices a security parameter that is associated with a security protocol of each of the one or more devices, wherein the one or more devices are security-enabled, and wherein the data structure is referenced in a header corresponding to a communications protocol of each of the one or more devices;

accessing at least one of the one or more devices to retrieve the security parameter from the data structure of the device;

wherein the at least one security parameter of the device is indicative of the security protocol of the device;

wherein the at least one security parameter is further indicative of whether a password related to the device is cryptographically wrapped;

wherein the at least one security parameter is within one or more base address registers of a capability structure of a plurality of capability structures of the PCI Express communications protocol;

enabling access to a security layer of at least one of the one or more devices such that an input/output security layer of the at least one of the one or more devices can be enabled or disabled;

wherein each of the plurality capability structures comprises a unique identifier and a capability identifier;

wherein the capability identifier associated with the at least one of the one or more devices is shared with and used by one or more other devices;

wherein the plurality of capability structures form a linked list;

wherein each of the plurality of capability structures includes a next capability pointer entry that points to at least one other of the plurality of capability structures; and wherein the security protocol of the device is a Trusted Platform Module supported by the at least one capability structure.

8. The method for providing a security parameter for the one or more devices of claim 7, wherein the communications protocol is PCI Express.

9. The method for providing a security parameter for the one or more devices of claim 7, wherein the data structure is within a configuration space of the PCI Express communications protocol.

10. The method for providing a security parameter for the one or more devices of claim 7, wherein the security parameter is indicative of a password associated with each of the one or more devices and the security protocol for each of the one or more devices.

11. A computer system, comprising:
a processor;
a plurality of devices, wherein the processor is operable to access the devices and wherein the devices operate according a PCI Express communications protocol, wherein the plurality of devices are security-enabled;

wherein each device is associated with a data structure that is consistent with the PCI Express communications protocol and wherein the data structure identifies at least one security parameter associated with the device;

wherein the at least one security parameter of the device comprises at least a security protocol of the device;

wherein the at least one security parameter further comprises an identification of whether a password related to the device is cryptographically wrapped;

wherein the at least one security parameter is within one or more base address registers of a capability structure of a plurality of capability structures of the PCI Express communications protocol;

wherein the one or more base address registers enable access to a security layer of at least one of the devices so that at least one of the one or more processors can enable or disable an input/output security layer of the at least one of the devices;

wherein each of the plurality of capability structures comprises a unique identifier and a capability identifier, wherein the capability identifier associated with the at least one of the devices is shared with and used by one or more other devices;

wherein the plurality of capability structures form a linked list;

wherein each of the plurality of capability structures includes a next capability pointer entry that points to at least one other of the plurality of capability structures;

wherein the security protocol of the device is a Trusted Platform Module supported by the at least one capability structure.

12. The computer system of claim 11, wherein the data structure is within a configuration space of the PCI Express communications protocol.

13. The computer system of claim 11, wherein the at least one security parameter identifies whether the devices are associated with a security password.

14. The computer system of claim 11, wherein the at least one security parameter identifies whether a password associated with the devices are cryptographically wrapped.

* * * * *